United States Patent

Blytas et al.

[11] 4,359,450
[45] Nov. 16, 1982

[54] PROCESS FOR THE REMOVAL OF ACID GASES FROM GASEOUS STREAMS

[75] Inventors: George C. Blytas; Zaida Diaz, both of Houston, Tex.

[73] Assignee: Shell Oil Company, Houston, Tex.

[21] Appl. No.: 267,195

[22] Filed: May 26, 1981

[51] Int. Cl.³ ........................ B01D 53/34; C01B 17/04
[52] U.S. Cl. .................................... 423/226; 423/224; 423/243; 423/573 G
[58] Field of Search .............. 423/222, 224, 226, 573, 423/575, 578 R, 243

[56] References Cited

U.S. PATENT DOCUMENTS

| | | | |
|---|---|---|---|
| 3,068,065 | 12/1962 | Hartley et al. | 423/228 |
| 3,074,783 | 1/1963 | Paull | 423/437 |
| 3,226,320 | 12/1965 | Meuly et al. | 423/224 X |
| 3,347,621 | 10/1967 | Papadopoulos et al. | 423/226 |
| 3,580,950 | 5/1971 | Bersworth | 562/565 |
| 3,622,273 | 11/1971 | Roberts et al. | 423/573 |
| 3,933,993 | 1/1976 | Salemme | 423/226 |
| 3,961,015 | 6/1976 | Dailey | 423/229 |
| 4,009,251 | 2/1977 | Meuly | 423/573 |
| 4,085,192 | 4/1978 | Van Scoy | 423/226 |
| 4,091,073 | 5/1978 | Winkler | 423/226 |

Primary Examiner—Earl C. Thomas
Attorney, Agent, or Firm—Albert J. Adamcik

[57] ABSTRACT

Hydrogen sulfide, carbon dioxide, and carbonyl sulfide are removed from a gas stream in a staged procedure characterized by absorption of the $CO_2$ and COS and conversion of the hydrogen sulfide to produce sulfur in an absorbent mixture, hydrolysis of the carbonyl sulfide to produce a gas stream of hydrogen sulfide and carbon dioxide, and removal of the hydrogen sulfide from the gas stream.

36 Claims, 3 Drawing Figures

PROCESS FOR THE REMOVAL OF ACID GASES FROM GASEOUS STREAMS

BACKGROUND OF THE INVENTION

The presence of significant quantities of $H_2S$ or $H_2S$ and $CO_2$ in various "sour" industrial gaseous streams poses a persistent problem. Although various procedures have been developed to remove and recover these contaminants, most such processes are unattractive for a variety of reasons. An additional contaminant in $H_2S$, $CO_2$-containing streams is carbonyl sulfide (COS). In particular, this contaminant poses problems in conventional solvent-absorption schemes since it hydrolyzes slowly and cannot be released with the vent gas or with $CO_2$ recovered.

While some work has been done in the area of removal and conversion of $H_2S$ to sulfur by use of iron complexes in water gas streams, such processes generally are inapplicable directly to purification of hydrocarbon feedstock, coal gasification, or natural gas streams having high ratios of $CO_2$ to $H_2S$. For example, U.S. Pat. No. 3,266,320 (Meuly, et al.) discloses the removal of $H_2S$ from fluids passing through or leaving industrial process by adding to the polluted streams certain chelates of polyvalent metals. The chelates are added in an amount which is stoichiometrically substantially less than the amount of the pollutant, and the chelate- and pollutant-containing stream is contacted with oxygen. The preferred chelates are the iron, cobalt, and nickel chelates of acetyl acetone, cyclopentadiene, ethylene diamine tetraacetic acid, N-hydroxyethyl ethylene diamine triacetic acid, gluconic acid, tartaric acid and citric acid. The chelate is said to catalyze the reaction.

As indicated, however, this procedure is unsuited to gaseous hydrocarbon feedstock, coal gasification stream, or natural gas treatment since no provision is made for $CO_2$ removal. More importantly, the use of oxygen with the materials contemplated would be intolerable. Finally, the amounts of chelate employed in the patent are merely catalytic, and do not give the desired degree of $H_2S$ removal from gaseous streams.

Similarly, U.S. Pat. No. 3,622,273 (Roberts and Johnson) discloses the removal of $H_2S$ from a gaseous stream by contacting the gaseous stream with a solution containing, by weight, from 0.005 to 20 percent of a ferric ion complex, from 25.0 to 99.945 percent of water, and from 0.05 to 10.0 percent of a buffering agent selected from the group consisting of alkali metal carbonate and alkali metal bicarbonate. According to the patentees, known complexing agents, such as nitrilotriacetic acid and ethylene diamine tetraacetic acid, present stability problems when employed in $H_2S$ removal. To overcome these problems, the patentees specify the addition of a buffer to the treating solution, in the amount and type indicated previously. The ferrous complex resulting from reaction of the ferric complex with the $H_2S$ may be regenerated in a separate zone and reused indefinitely.

U.S. Pat. No. 4,091,073 to Winkler describes a process in which $H_2S$ and $CO_2$ are simultaneously removed from a variety of gas streams. The gas stream containing the sour gases is contacted with a solution of the Fe(III) chelate of N-(2-hydroxyethyl)ethylene diamine triacetic acid in a $CO_2$-selective solvent. The hydrogen sulfide is converted to sulfur, the $CO_2$ is absorbed to produce a purified gas stream, and the Fe(III) chelate is converted to the Fe(II) chelate. The process includes sulfur removal and simultaneous regeneration of the solvent and the Fe(III) chelate.

SUMMARY OF THE INVENTION

Accordingly, the invention, in one embodiment, is directed to a process for removing $H_2S$, $CO_2$ and COS from gaseous streams, the process being characterized by reaction of the $H_2S$ to crystalline or solid sulfur and absorption of the $CO_2$ and COS, desorption of the $CO_2$ and COS, hydrolysis of the COS, and recovery of the $H_2S$ produced by the hydrolysis. More particularly, the invention comprises a process for the removal of $H_2S$, $CO_2$ and and COS from gas streams containing these materials comprising:

(a) contacting the sour gaseous stream in a contacting zone with a lean $CO_2$, COS-selective absorbent mixture containing an effective amount of an oxidizing reactant under conditions to produce a sweet gaseous stream and an absorbent mixture containing absorbed $CO_2$, COS, solid sulfur, and a reduced reactant;

(b) stripping $CO_2$ and COS from the absorbent mixture to produce a gas stream comprising or containing $CO_2$ and COS;

(c) contacting the gas stream comprising $CO_2$ and COS with a catalyst for the hydrolysis of COS, in the presence of water, and under conditions to react COS and produce a gas stream containing $CO_2$ and $H_2S$; and (d) removing $H_2S$ from the gas stream.

Two different methods of removal of the $H_2S$ produced from the hydrolysis of COS are suitably employed. In one embodiment, the $H_2S$ in the gas stream is contacted in a "secondary" contact zone, with reactant solution, in a manner similar to that in which the main quantity of $H_2S$ has been removed previously in the "primary" zone. In another embodiment, an absorption-desorption system may be used, the recovered $H_2S$ being treated as desired.

Whichever method of removal of the $H_2S$ produced from the hydrolysis reaction is employed, the process of the invention is preferably operated as a cyclic procedure with provision for removal of elemental sulfur produced and regeneration of the reactant-absorbent mixture. In particular, the process of the invention provides for sulfur removal before or after regeneration of the aqueous reactant-containing absorbent mixture. If a reactant solution is utilized to remove the $H_2S$ produced from hydrolysis of COS, by producing sulfur, and the resulting reactant solution is combined with the "primary" reactant solution, all of the sulfur may be removed after the combination. Alternatively, the sulfur from the hydrolysis may be removed separately, or passed on to the "primary" contact zone for "subsequent" removal. Where $H_2S$ from the hydrolysis reaction is removed by absorption, the $H_2S$, on desorption, is preferably passed to the "primary" removal stage for conversion to sulfur, which is removed, as desired. Sulfur removal from solution may be accomplished by means such as extraction, liquid flotation, filtration, or use of a hydroclone, etc.

DETAILED DESCRIPTION OF THE INVENTION

In the first step of the process, the gas stream to be treated is contacted with an absorbent mixture containing an oxidizing reactant. Any suitable oxidized reactant material may be utilized. Particularly suitable reactant materials include polyvalent metallic ions, (and mixtures thereof), such as iron, vanadium, copper, manganese, and nickel, and include polyvalent metal chelates, (and mixtures thereof), and mixtures of the ions and chelates. As used herein, unless otherwise inconsistent with the intent expressed, the term "mixtures thereof," in referring to the reactant materials indicated, includes mixtures of the polyvalent metal ions, mixtures of the polyvalent metal chelates, and mixtures of polyvalent metal ions and polyvalent metal chelates. Preferred reactants are coordination complexes in which polyvalent metals form chelates with an acid having the formula:

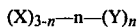

wherein n is a whole number from 1 to 3; Y is an acetic acid or propionic acid group; X is 2-hydroxyethyl, 2-hydroxy propyl, or an alkyl group having from one to four carbon atoms; or

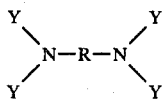

wherein:
from two to four of the groups Y are selected from acetic and propionic acid groups;
from zero to two of the groups Y are selected from 2-hydroxy ethyl, 2-hydroxy propyl, and

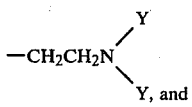

R is ethylene, propylene or isopropylene or alternatively cyclohexane or benzene where the two hydrogen atoms replaced by nitrogen are in the 1,2 position, and mixtures of such complexes.

Any polyvalent metal may be used, but iron, copper and manganese are preferred, particularly iron. The polyvalent metal should be capable of oxidizing hydrogen sulfide, while being reduced itself from a higher to a lower valence state, and should then be oxidizable by oxygen from the lower valence state to the higher valence state in a typical redox reaction. Other polyvalent metals which can be used include lead, mercury, palladium, platinum, tungsten, nickel, chromium, cobalt, vanadium, titanium, tantalum, zirconium, molybdenum, and tin.

The polyvalent metal chelates are readily formed in aqueous solution by reaction of an appropriate salt, odxide or hydroxide of the polyvalent metal and the chelating agent in the acid form or an alkali metal or ammonium salt thereof. Exemplary chelating agents include amino acetic acids derived from ammonia or 2-hydroxy alkyl amines, such as glycine, diglycine (imino diacetic acid), NTA (nitrilo triacetic acid), 2-hydroxy alkyl glycine; di-hydroxyalkyl glycine, and hydroxyethyl or hydroxypropyl diglycine; amino acetic acids derived from ethylene diamine, diethylene triamine, 1,2-propylene diamine, and 1,3-propylene diamine, such as EDTA (ethylene diamine tetraacetic acid), HEDTA (2-hydroxy ethylethylene diamine triacetic acid), DETPA (diethylene triamine pentaacetic acid); amino acetic acid derivatives of cyclic 1,2-diamines, such as 1,2-diamino cyclohexane-N,N-tetraacetic acid, and 1,2-phenylenediamine-N,N-tetraacetic acid, and the amides of polyamino acetic acids disclosed in Bersworth U.S. Pat. No. 3,580,950. The Fe(III) chelates of NTA and HEDTA are preferred.

The amount of reactant compound, chelate, or mixture thereof, supplied is an effective amount, e.g., that amount sufficient to convert all or substantially all of the $H_2S$ in the gas stream, and will generally be on order of at least about one mol (basis polyvalent metal or chemical equivalent) per mole of $H_2S$. Ratios of from about 1 or 2 mols to about 15 mols of compound or chelate per mol of $H_2S$ may be used, with ratios of from about 2 mols per mol to about 5 mols of compound or chelate per mol of $H_2S$ being preferred. The manner of preparing the admixture is a matter of choice. For example, the compounds or chelates may be added to the absorbent, and, if necessary, then water added. Since some compounds and chelates have a significant solubility in given absorbents, and since water is produced by the reaction of the $H_2S$ and these reactants, precise amounts of water to be added, if added, cannot be given. Preferably, however, the reactant is added as an aqueous solution to the liquid absorbent. Where the reactant is supplied as an aqueous solution, the amount of reactant supplied may be about 20 percent to about 80 percent by volume of the total absorbent admixture supplied to the adsorption zone. Where iron chelates are utilized, the Fe(III) chelate solution will generally be supplied as an aqueous solution having a concentration of from about 0.1 molar to about 3 molar. A composition of about 1 molar is preferred.

The particular type of gaseous stream treated is not critical, regardless of which embodiment of the invention is employed, as will be evident to those skilled in the art. Streams particularly suited to the practice of the invention are naturally occurring gases, synthesis gases, process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, especially those streams of this type having low concentrations of $H_2S$ and $CO_2$. The term "hydrocarbon stream(s)", as employed herein, is intended to include streams containing significant quantities of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.1 percent to about 10 percent by volume. $CO_2$ content may be similar, and may range from about 0.1 percent to over 99 percent by volume. COS content may also vary, but normally will range from about 0.01 percent to about 1 percent by volume. Obviously, the amount of $H_2S$, $CO_2$ and COS present is not generally a limiting factor in the practice of the invention.

The temperatures employed in the contact or primary contact zone are not generally critical, except that higher temperatures appear to enhance decomposition of complexes employed. A relatively wide range of temperatures below the melting point of sulfur may be used, e.g., from 10° C. to 80° C. or even 110° C. may be utilized, although a range of from about 20° C. to about 60° C. is preferred. In many commercial applications, such as the removal of H₂S from natural gas to meet pipeline specifications, contact at ambient temperatures is preferred. Contact times may range from about 1 second to about 270 seconds, or longer, with contact times of 2 seconds to 120 seconds being preferred.

Similarly, in the regeneration zone or zones, temperatures may be varied widely. Preferably, the regeneration zone should be maintained as close as possible to the same temperature as the contact or primary contact zone. If heat is added to strip or assist regeneration, cooling of the admixture is required before return of the admixture to the contact or primary zone. In general, temperatures of from about 10° C. to 80° C., preferably 20° C. to 60° C. may be employed.

Pressure conditions in the contact or primary zone may vary widely, depending on the pressure of the gas to be treated. For example, pressures in the contact zone may vary from one atmosphere up to one hundred fifty or even two hundred atmospheres. Pressures of from one atmosphere to about one hundred atmospheres are preferred. In the regeneration zone or zones, pressures will range from about one atmosphere to about three or four atmospheres. The pressure-temperature relationships involved are well understood by those skilled in the art, and need not be detailed herein. Other conditions of operation for this type of reaction process, e.g., pH, etc., are further described in U.S. Pat. No. 3,068,065 to Hartley, et al., dated Dec. 11, 1962, and U.S. Pat. No. 4,009,251 to Meuly, issued Feb. 22, 1977, which disclosures are incorporated herein by reference. Preferably, if the iron chelate of nitrilotriacetic acid is used, pH in the process of the invention will range from about 6 to about 7.5 and the molar ratio of the nitrilotriacetic acid to the iron is from about 1.2 to 1.4. The procedure is preferably conducted continuously.

As noted, the oxidizing reactant, especially the polyvalent metal compounds and polyvalent metal chelates, are supplied in an absorbent mixture. The absorbent or absorbents employed are those absorbents which have a high degree of selectivity in absorbing $CO_2$, COS (and preferably H₂S as well) from the gaseous streams. Any of the known absorbents conventionally used (or mixtures thereof) which do not affect the activity of the reactant, and which exhibit sufficient miscibility or solvency for the reactant or reactant solution, may be employed. Here again, the particular absorbent chosen is a matter of choice, given these qualifications, and selection can be made by routine experimentation. For example, Carbitol (diethylene glycol monoethyl ether), propylene carbonate, tetraethylene glycol-dimethyl ether, N-methyl pyrrolidone, sulfolane, methyl isobutyl ketone, 2,4-pentanedione, 2,5-hexanedione, diacetone alcohol, hexyl acetate, cyclohexanone, mesityl oxide, and 4-methyl-4-methoxy-pentone-2 may be used. Suitable temperature and pressure relationships for different $CO_2$, COS-selective absorbents are known, or can be calculated by those skilled in the art.

The reduced reactant is regenerated by stripping the absorbent admixture with oxygen. As used herein, the term "oxygen" includes oxygen-containing gases, such as air or air enriched with oxygen. The oxygen stripping accomplishes two functions, the stripping of any residual $CO_2$ (if originally present) and the oxidation of the reduced reactant to its higher oxidation state. The oxygen (in whatever form supplied) is supplied in a stoichiometric excess with respect to the amount of reduced reactant present in the mixture. Preferably, the oxygen is supplied in an amount of from about 1.2 to 3 times excess.

As indicated, the absorbent mixture, after reaction of the H₂S to produce sulfur and absorption of COS, is treated in a separate zone to remove COS. This is accomplished by stripping the COS from the absorbent mixture, and may be accomplished in any suitable fashion. The $CO_2$ absorbed will also be desorbed at this time. For example, the "loaded" absorbent mixture may be heated, or subjected to reduced pressure, or both, or stripped with a suitable gas, such as air. In any event, the COS, after desorption, must be treated since it cannot be vented. To this end, the COS is contacted, in the gas phase, in the presence of water, for hydrolysis of the COS. The hydrolysis of COS is shown by the following formula:

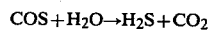

$$COS + H_2O \rightarrow H_2S + CO_2$$

In general, the contacting of the gas stream of COS with the reactant-absorbent mixture often provides sufficient water, as vapor, for the hydrolysis of the COS, although additional water may be added if the COS concentration is high.

Any catalyst demonstrating activity for this reaction may be employed. Preferred catalysts are Ni, Pd, Pt, Co, Rh or In. In general, most of these materials will be provided as solids deposited on a suitable support material, preferred amorphous support materials being the aluminas, silica aluminas, and silica. Crystalline support materials such as the aluminosilicates, known as molecular sieves (zeolites), synthetic or natural, may also be used. The selection of the particular catalyst (and support, if employed) are within the skill of those working in the field. Platinum on alumina is preferred.

The temperatures employed in the hydrolysis zone are not critical, except in the sense that the temperatures employed will allow substantially complete conversion of the COS. Temperatures will range from about 50° C. to 150° C. or even 200° C., although a range of from about 50° C. to about 150° C. is preferred. As noted previously, in many commercial applications, such as the removal of H₂S, $CO_2$, and COS from natural gas to meet pipeline specifications, contact at ambient temperatures or as close to ambient temperatures as possible are preferred. Those skilled in the art may adjust the temperatures, as needed, to provide efficient reaction temperatures. Contact times will range from about 0.5 second to about 10 seconds, with contact times of 1 second to 3 seconds being preferred. Pressures employed in the hydrolysis zone may be atmospheric, below atmospheric, or greater than atmospheric.

In accordance with the invention, the H₂S produced from the COS hydrolysis is removed in one of two ways. If a "secondary" contact zone is employed, temperatures, pressures, etc. will be similar to those in the "primary" contact zone, the principal difference between the two zones being the normally relatively smaller concentration of H₂S being removed. Preferably, the reactant solution employed is all or part of the regenerated solution from the regeneration zone. As described, supra, the sulfur produced may be removed, as desired.

Alternately, the H₂S from the hydrolysis of the COS may be removed in an absorption zone by absorption in a suitable absorbent or solvent. If large quantities of $CO_2$ are present, the absorbents are suitably $H_2S$-selective, and the absorption zone is operated to achieve selectivity. After absorption of the $H_2S$, the "loaded" absorbent is removed from the absorption zone, the $H_2S$ is stripped from the loaded absorbent in a stripping or regeneration zone, the "lean" absorbent is returned for re-use, and the $H_2S$ is disposed of. Preferably, the $H_2S$ is returned to the contact zone for reaction to sulfur. Solvents, pressures, temperatures, etc. for this type of procedure are known and well understood by those skilled in the art, and may readily adjusted to provide optimum results. For example, those solvents and conditions, etc. described in U.S. Pat. No. 3,347,621 to Papadopoulos, et al., and U.S. Pat. No. 4,085,192 to Van Scoy, both incorporated herein by reference, may be utilized. Mixtures of such solvents or absorbents also may be used.

In order to describe the invention with greater particularity, reference is made to the accompanying schematic drawing.

Figure 1:
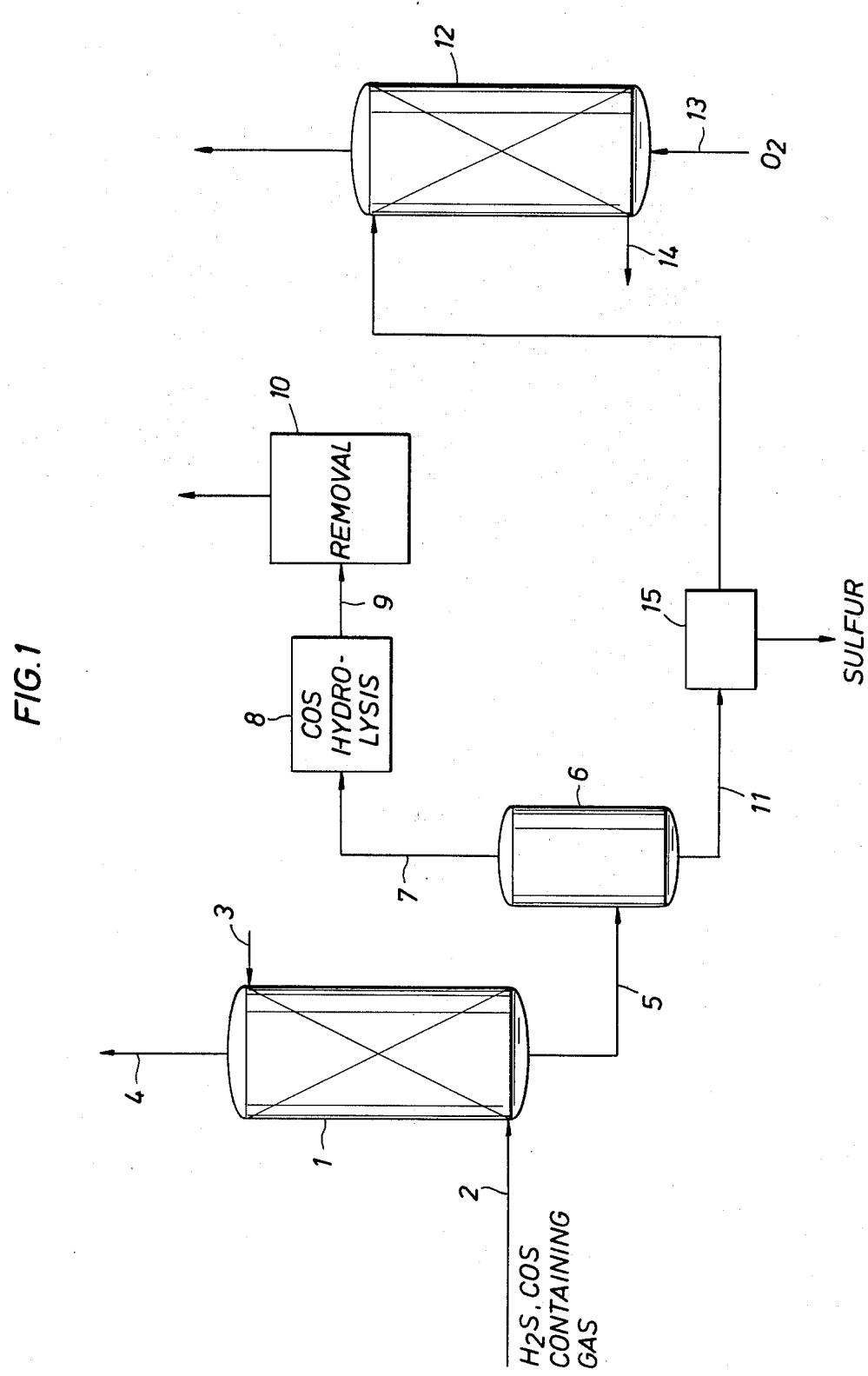
FIG. 1 illustrates the broad removal approach of the invention.

In FIG. 1, a gas stream, such as a natural gas stream containing 1 percent $H_2S$, 1.5 percent $CO_2$, and 0.1 percent COS, enters contactor 1 via line 2. Contactor 1 is a tray contactor, although any suitable contacting device (such as a venturi) may be employed. An oxidizing reactant absorbent mixture, e.g., a mixture comprising 45 percent by volume of water and iron chelate and 55 percent by volume of sulfolane, the chelate being present in an amount to provide a 0.4 molar mixture of the Fe(III) complex of (n-hydroxyethyl)ethylene diamine triacetic acid, enters contactor 1 via line 3. For illustrative purposes, it will be assumed that the gaseous stream enters at 200 MSCF per hour, while the reactant-absorbent mixture enters at 20 M gallons per hour. Pressure of the gas in line 1 is 1000 PSIG, and the temperature of the gas is 30° C. Reactant mixture is supplied at a temperature of 30° C. The countercurrent flow of liquid and gas, as illustrated, provides for good contact, reaction of the $H_2S$ in the stream to sulfur, and effective removal of COS from the gas stream. As will be understood by those skilled in the art, water and the Fe(II) complex or chelate of (n-hydroxyethyl)ethylene diamine triacetic acid are also produced by the reaction. Sweet gas is removed overhead via line 4.

Reactant-absorbent mixture is removed from contactor 1 via line 5, and stripped of $CO_2$ and COS content in stripper 6. The $CO_2$ and COS are stripped by pressure reduction, and removed as a gas stream overhead. Upon exit from stripper 6, the COS-containing gas stream, which is substantially free of $H_2S$, passes via line 7 to reaction or contact zone 8 wherein it is contacted with a catalyst containing about one percent Pt on activated alumina. The temperature of the exit of reactor 8 is about 100° C., pressure about 200 p.s.i.g., and total contact time in zone 8 is 2 seconds. In this illustration, sufficient water vapor is present from the contactor 1 so that water need not be added. Obviously, water may be added, if necessary. Substantially complete conversion of the COS may be achieved in contact zone 8.

From contact zone 8, the gas stream, now containing $H_2S$ and additional $CO_2$ from the hydrolysis of COS, passes via line 9 to $H_2S$ removal zone 10. Removal zone 10 may utilize a reactant solution or absorption-desorption system, as set out more fully hereinafter. Purified gas is removed, as shown.

Concomitantly, the reaction solution in stripper 6, now containing some reduced reactant, sulfur and additional water, is passed via line 11 to regeneration zone 12 where the solution is contacted with air supplied via line 13 to regenerate the reduced reactant. The molar ratio of oxygen (in air) to Fe(II) complex is maintained at about 2 to 1, and temperature in the regeneration zone is maintained at about 30° C. Regeneration solution is removed via line 14, and may be returned, at least partly, to contactor 1. Sulfur removal is shown prior to regeneration, by filtration, at 15.

Figure 2:
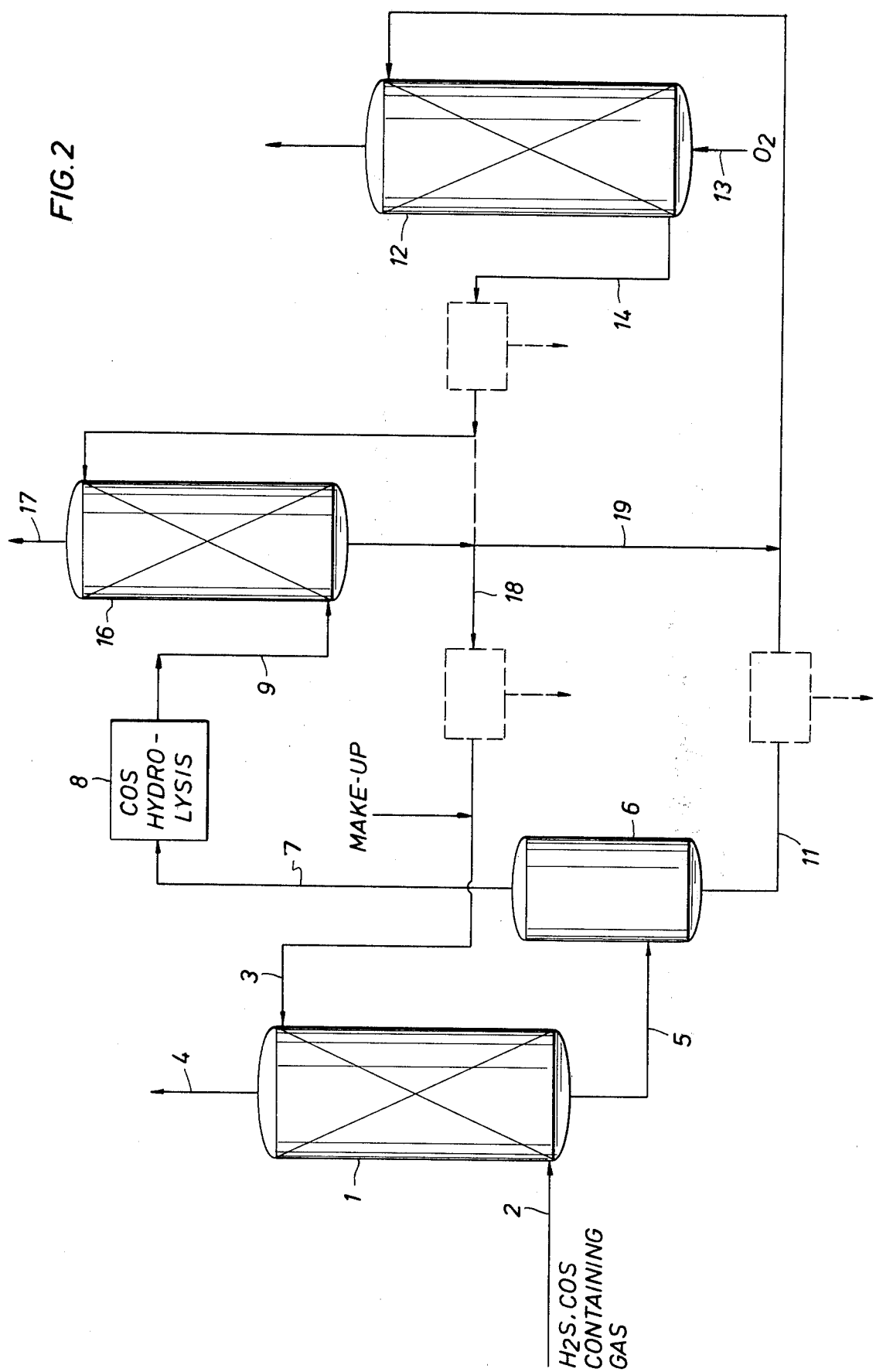
FIG. 2 and FIG. 3 illustrate differing concepts of removal of $H_2S$ produced by hydrolysis of COS. All values are merely exemplary or calculated, and similar number designations represent similar features.

In FIG. 2, a gas stream similar to that described previously enters contactor 1 via line 2 and is contacted with an absorbent mixture from line 3 comprising 75 percent by volume Carbitol and 25 percent by volume chelate solution, the chelate being present in an amount to provide a mixture containing 0.2 molar Fe(III) chelate of nitrilotriacetic acid. Sweet gas is removed overhead via line 4, and reactant-absorbent mixture is removed, as in the previous illustration, via line 5. In stripper 6, sufficient heat is supplied to desorb the bulk of the $CO_2$ and the COS as a gas stream via line 7. The gas stream in line 7 is contacted in reaction zone 8 in the presence of water vapor with a catalyst comprising about one percent Pt on activated alumina to hydrolyze the COS in the stream to $H_2S$ and $CO_2$. Temperatures, pressures, etc., are similar to those described in reference to FIG. 1. In accordance with the invention, the gas stream, containing the hydrolysis products, passes via line 9 to "secondary" contactor 16 where it is contacted with an reactant-absorbent mixture to produce sulfur. While the contact procedure employed in contactor 16, including the solution employed, may be quite independent from the contact procedure employed in "primary" contactor 1, it is much preferred that the reactant absorbent mixture be the same or similar, and that the mixture employed in 16 constitute the mixture utilized in contactor 1, or be a portion thereof. Thus, e.g., the mixture employed in 16 may be the make-up for contactor 1, may be the regenerated stream from a regeneration zone, may be merely a portion of the regenerated reactant solution from a regeneration zone, or any suitable combination thereof. What is important, simply, is that sufficient reactant (e.g., polyvalent metal ions or chelate) be present in contactor 16 to convert the $H_2S$ in stream 9 to sulfur. For purposes of this illustration, the reactant-absorbent mixture employed is the regenerated solution containing the Fe(III) chelate of nitrilotriacetic acid to be employed in the primary contact zone, as outlined more fully hereinafter. Accordingly, the reaction of the $H_2S$ and the Fe(III) chelate of nitrilotriacetic acid produces sulfur and the reduced chelate, but, because the concentration of $H_2S$ in stream 9 is low, the mixture is quite suitable for use in contactor 1. The contactor 16 is preferably operated under conditions to reject $CO_2$ if possible, via line 17. However, the $CO_2$ absorbed is easily disposed of. If desired, the partially loaded absorbent mixture may be forwarded, via line 18, to the primary contactor and hence to stripper 6, or, if some loss of $CO_2$ is acceptable, via lines 19 and 11 to regenerator 12 where it is removed. Sulfur may or may not be removed prior to entry of the reactant absorbent mixture into contactor 1.

Concomitantly, reactant-absorbent mixture, containing some Fe(II) chelate of nitrilotriacetic acid and sulfur, is forwarded via line 11 to regeneration zone 12. As shown in dotted line boxes, the sulfur may be removed prior to regeneration, after regeneration, or after exit from unit 16. Preferably, sulfur is removed after regeneration.

In regenerator 12, oxygen is supplied, via line 13, in molar excess. Preferably, the oxygen is supplied as air, in a ratio of about 2.0 or greater per mole of Fe(II) chelate in the mixture. Temperature of the mixture is preferably around 30° C., and pressure is suitably 25 psig. Regeneration in this manner has the added advantage of removing some water vapor, thus aiding in prevention of water build-up in the system and reducing bleed and make-up problems. It is not necessary that all of the Fe(II) chelate be converted.

Regenerated absorbent mixture, i.e., an absorbent mixture in which at least the bulk of the Fe(II) chelate has been converted to the Fe(III) chelate, is removed via line 14. As indicated, the mixture may be passed, (all, or part) to contactor 16, or into line 18 and through line 3 to contactor 1.

Figure 3:
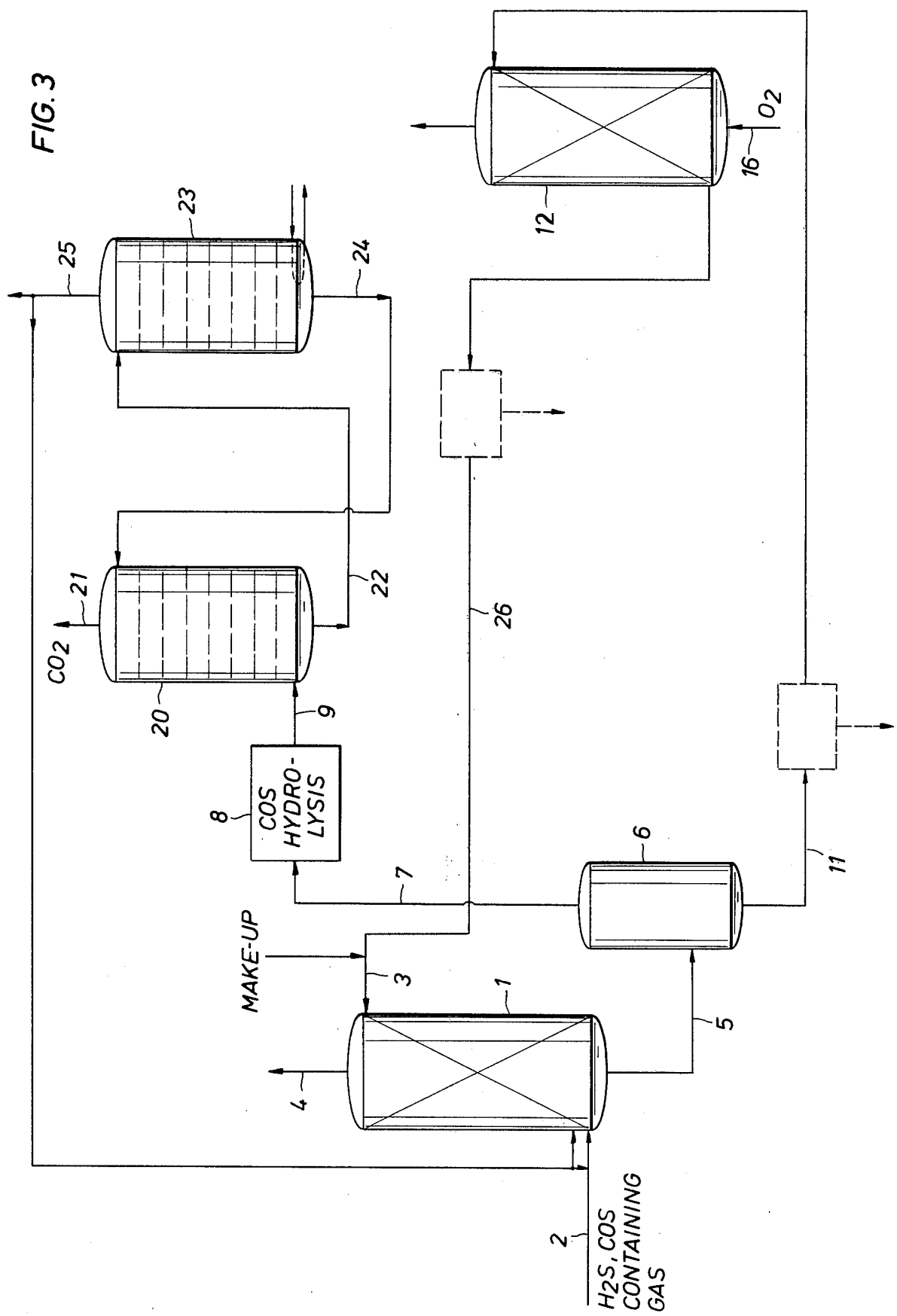

In the embodiment of FIG. 3, the operation of units 1, 2, 4 through 9, 11 and 12 is similar to that of corresponding units of the embodiment of FIGS. 1 and 2. The numeral 16 designates the air inlet in this figure. However, the treatment of the $H_2S$ (and $CO_2$, if desired) from the hydrolysis is different, and the return of the regenerated reactant mixture is direct. Specifically, the gas stream in line 9 enters absorber 20 wherein it is contacted with an absorbent solution, e.g., an aqueous solution containing 2 molar diisopropanolamine. Absorber 20 is preferably a tray absorption column, although other types may be used. $H_2S$ is absorbed from the gas stream, $CO_2$ being rejected and exiting absorber 20 via line 21. Conditions for absorbing the $H_2S$ (and rejecting $CO_2$) are well known, and form no part of the invention. The $H_2S$-containing "loaded" absorbent exits absorber 20 via line 22, and passes to stripping or regeneration column 23 wherein the $H_2S$ is stripped from the absorbent, preferably by heat supplied as steam. "Lean" absorbent is returned via line 24 for re-utilization in absorber 20, while $H_2S$ is removed via line 25. The $H_2S$ in line 25 may be treated in any suitable fashion, but is preferably returned to contactor 1, either directly, or via line 2. If $CO_2$ has been absorbed to any extent, provision may also be made for its removal or recovery. Concomitantly, the regenerated reactant mixture from regeneration column 12 is passed, via lines 26 and 3 to contactor 1. Sulfur recovery may be made prior or subsequent to regeneration (shown as dotted line boxes).

While the invention has been illustrated with particular apparatus, those skilled in the art will appreciate that, except where specified, other equivalent or analogous units may be employed. The term "zones," as employed in the specification and claims, includes, where suitable, the use of segmented equipment operated in series, or the division of one unit into multiple units because of size constraints, etc. For example, an absorption column might comprise two separate columns in which the solution from the lower portion of the first column would be introduced into the upper portion of the second column, the gaseous material from the upper portion of the first column being fed into the lower portion of the second column. Parallel operation of units, is of course, well within the scope of the invention.

Again, as will be understood by those skilled in the art, the solutions or mixtures employed may contain other materials or additives for given purposes. For example, U.S. Pat. No. 3,933,993 discloses the use of buffering agents, such as phosphate and carbonate buffers. Similarly, U.S. Pat. No. 4,009,251 describes various additives, such as sodium oxalate, sodium formate, sodium thiosulfate, and sodium acetate, which may be beneficial.

What is claimed is:

1. A process for the removal of $H_2S$, $CO_2$, and COS from a sour gaseous stream containing $H_2S$, $CO_2$, and COS comprising:
    (a) contacting said sour gaseous stream in a contacting zone with a lean $CO_2$, COS-selective liquid absorbent mixture containing an effective amount of an oxidizing reactant under conditions to produce a sweet gaseous stream and a liquid absorbent admixture containing absorbed $CO_2$, COS, solid sulfur, and a reduced reactant;
    (b) stripping $CO_2$ and COS from said absorbent admixture in a stripping zone to produce a gas stream comprising $CO_2$ and COS;
    (c) contacting the gas stream comprising $CO_2$ and COS with a catalyst for the hydrolysis of COS, in the presence of water, and under conditions to react COS and water and produce a gas stream containing $CO_2$ and $H_2S$;
    (d) and removing the $H_2S$ from the gas stream.

2. A process for the removal of $H_2S$, $CO_2$, and COS from a sour gaseous stream containing $H_2S$, $CO_2$, and COS comprising:
    (a) contacting said sour gaseous stream in a contacting zone with a lean $CO_2$, COS-selective liquid absorbent mixture containing an effective amount of an oxidizing reactant, under conditions to produce a sweet gaseous stream and a liquid absorbent admixture containing absorbed $CO_2$, COS, solid sulfur and a reduced reactant;
    (b) stripping $CO_2$ and COS from said absorbent admixture in a stripping zone to produce a gas stream comprising $CO_2$ and COS;
    (c) contacting the gas stream comprising $CO_2$ and COS with a catalyst for the hydrolysis of COS, in the presence of water, and under conditions to convert COS and water and produce a gas stream containing $CO_2$ and $H_2S$;
    (d) removing the $H_2S$ from the gas stream by contacting the gas stream with an aqueous reactant solution which comprises an effective amount of an oxidizing reactant, and producing a purified gas stream and reactant solution containing sulfur.

3. The process of claim 1 wherein the sulfur is removed from the absorbent admixture remaining from step (b), the admixture is regenerated in a regeneration zone with oxygen to produce a regenerated reactant absorbent admixture, at least a portion of the regenerated reactant absorbent admixture is employed in step (d) to remove the $H_2S$ from the gas stream by contacting the gas stream with the regenerated reactant absorbent admixture, and produce regenerated reactant absorbent admixture containing sulfur, and regenerated reactant absorbent admixture containing sulfur is employed as lean $CO_2$, COS-selective liquid absorbent mixture in the contacting zone.

4. The process of claim 2 wherein the absorbent admixture remaining from step (b) is regenerated in a regeneration zone with oxygen to produce a regenerated reactant absorbent admixture, sulfur is removed, at least a portion of the regenerated reactant absorbent admixture is employed in step (d) to remove the H₂S from the gas stream by contacting the gas stream with the regenerated reactant absorbent admixture and produce a regenerated reactant absorbent admixture containing sulfur, and regenerated reactant absorbent admixture containing sulfur is employed as lean $CO_2$, COS-selective liquid absorbent mixture in the contacting zone.

5. A process for the removal of $H_2S$, $CO_2$, and COS from a sour gaseous stream containing $H_2S$, $CO_2$, and COS comprising:
  (a) contacting said sour gaseous stream in a contacting zone with a lean $CO_2$, COS-selective liquid absorbent mixture containing an effective amount of an oxidizing reactant selected from polyvalent metal ions, polyvalent metal chelate compounds, and mixtures thereof, under conditions to produce a sweet gaseous stream and a liquid absorbent admixture containing absorbed $CO_2$, COS, solid sulfur and a reduced reactant;
  (b) stripping $CO_2$ and COS from said absorbent admixture in a stripping zone to produce a gas stream comprising $CO_2$ and COS;
  (c) contacting the gas stream comprising $CO_2$ and COS with a catalyst for the hydrolysis of COS, in the presence of water, and under conditions to react COS and water and produce a gas stream containing $CO_2$ and $H_2S$;
  (d) and removing the $H_2S$ from the gas stream.

6. A process for the removal of $H_2S$, $CO_2$, and COS from a sour gaseous stream containing $H_2S$, $CO_2$, and COS comprising:
  (a) contacting said sour gaseous stream in a contacting zone with a lean $CO_2$, COS-selective liquid absorbent mixture containing an effective amount of an oxidizing reactant selected from polyvalent metal ions, polyvalent metal chelate compounds, and mixtures thereof, under conditions to produce a sweet gaseous stream and a liquid absorbent admixture containing absorbed $CO_2$, COS, solid sulfur and a reduced reactant;
  (b) stripping $CO_2$ and COS from said absorbent admixture in a stripping zone to produce a gas stream comprising $CO_2$ and COS;
  (c) contacting the gas stream comprising $CO_2$ and COS with a catalyst for the hydrolysis of COS, in the presence of water, and under conditions to convert COS and water and produce a gas stream containing $CO_2$ and $H_2S$;
  (d) removing the $H_2S$ from the gas stream by contacting the gas stream with an aqueous oxidizing reactant solution which comprises an effective amount of a reactant selected from polyvalent metal ions, polyvalent metal chelate compounds, and mixtures thereof, and producing a purified gas stream and reactant solution containing sulfur.

7. The process of claim 5 wherein the sulfur is removed from the absorbent admixture remaining from step (b), the admixture is regenerated in a regeneration zone with oxygen to produce a regenerated reactant absorbent admixture, at least a portion of the regenerated reactant absorbent admixture is employed in step (d) to remove the $H_2S$ from the gas stream by contacting the gas stream with the regenerated reactant absorbent admixture, and produce regenerated reactant absorbent admixture containing sulfur, and regenerated reactant absorbent admixture containing sulfur is employed as lean $CO_2$, COS-selective liquid absorbent mixture in the contacting zone.

8. The process of claim 6 wherein the absorbent admixture remaining from step (b) is regenerated in a regeneration zone with oxygen to produce a regenerated reactant absorbent mixture, sulfur is removed, at least a portion of the regenerated reactant absorbent admixture is employed in step (d) to remove the $H_2S$ from the gas stream by contacting the gas stream with the regenerated reactant absorbent admixture, and producing a regenerated reactant absorbent admixture containing sulfur, and regenerated reactant absorbent admixture containing sulfur is employed as lean $CO_2$, COS-selective liquid absorbent mixture in the contacting zone.

9. The process of claim 6 wherein the absorbent admixture remaining from step (b) is regenerated in a regeneration zone with oxygen to produce a regenerated reactant absorbent admixture containing sulfur, at least a portion of the regenerated reactant absorbent admixture containing sulfur is employed in step (d) to remove the $H_2S$ from the gas stream by contacting the gas stream with regenerated reactant absorbent admixture containing sulfur, sulfur is removed from the aqueous regenerated reactant absorbent admixture to produce a regenerated reactant absorbent admixture, and regenerated reactant absorbent admixture is employed as lean $CO_2$, COS-selective liquid absorbent in the contacting zone.

10. The process of claim 7 wherein the portion of regenerated reactant absorbent admixture employed in step (d) is a minor portion.

11. The process of claim 8 wherein the portion of regenerated reactant absorbent admixture employed in step (d) is a minor portion.

12. The process of claim 9 wherein the portion of regenerated reactant absorbent admixture employed in step (d) is a minor portion.

13. The process of claim 12 wherein the minor portion of regenerated reactant absorbent admixture containing sulfur is combined with the regenerated reactant absorbent admixture prior to removing sulfur from the regenerated reactant solution.

14. The process of claim 7 wherein the reactant comprises a polyvalent metal chelate compound or a mixture of polyvalent metal chelate compounds.

15. The process of claim 8 wherein the reactant comprises a polyvalent metal chelate compound or a mixture of polyvalent metal chelate compounds.

16. The process of claim 9 wherein the reactant comprises a polyvalent metal chelate compound or a mixture of polyvalent metal chelate compounds.

17. The process of claim 7 wherein the reactant comprises an iron chelate of an acid having the formula

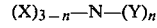

wherein n is a whole number from 1 to 3; Y is an acetic acid or propionic acid group; X is 2-hydroxyethyl, 2-hydroxy propyl, or an alkyl group having from one to four carbon atoms; or

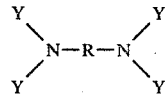

wherein:

from two to four of the groups Y are selected from acetic and propionic acid groups;
from zero to two of the groups Y are selected from 2-hydroxy ethyl, 2-hydroxy propyl, and

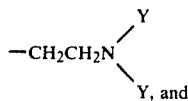

R is ethylene, propylene or isopropylene or alternatively cyclohexane or benzene where the two hydrogen atoms replaced by nitrogen are in the 1,2 position, and mixtures thereof.

18. The process of claim 8 wherein the reactant comprises and iron chelate of an acid having the formula

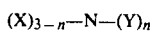

wherein n is a whole number from 1 to 3; Y is an acetic acid or propionic acid group; X is 2-hydroxyethyl, 2-hydroxy propyl, or an alkyl group having from one to four carbon atoms; or

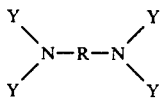

wherein:
from two to four of the groups Y are selected from acetic and propionic acid groups;
from zero to two of the groups Y are selected from 2-hydroxy ethyl, 2-hydroxy propyl, and

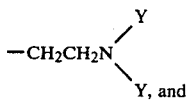

R is ethylene, propylene or isopropylene or alternatively cyclohexane or benzene where the two hydrogen atoms replaced by nitrogen are in the 1,2 position, and mixtures thereof.

19. The process of claim 9 wherein the reactant comprises an iron chelate of an acid having the formula

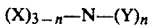

wherein n is a whole number from 1 to 3; Y is an acetic acid or propionic acid group; X is 2-hydroxyethyl, 2-hydroxy propyl, or an alkyl group having from one to four carbon atoms; or

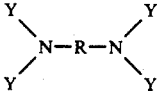

wherein:
from two to four of the groups Y are selected from acetic and propionic acid groups;
from zero to two of the groups Y are selected from 2-hydroxy ethyl, 2-hydroxy propyl, and

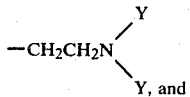

R is ethylene, propylene or isopropylene or alternatively cyclohexane or benzene where the two hydrogen atoms replaced by nitrogen are in the 1,2 position, and mixtures thereof.

20. The process of claim 7 wherein the reactant is selected from Fe(III) chelates of (n-hydroxyethyl) ethylene diamine triacetic acid, nitrilotriacetic acid, and mixtures of such chelates.

21. The process of claim 8 wherein the reactant is selected from Fe(III) chelates of (n-hydroxyethyl) ethylene diamine triacetic acid, nitrilotriacetic acid, and mixtures of such chelates.

22. The process of claim 9 wherein the reactant is selected from Fe(III) chelates of (n-hydroxyethyl) ethylene diamine triacetic acid, nitrilotriacetic acid, and mixtures of such chelates.

23. The process of claim 10 wherein the reactant is selected from Fe(III) chelates of (n-hydroxyethyl) ethylene diamine triacetic acid, nitrilotriacetic acid, and mixtures of such chelates.

24. The process of claim 11 wherein the reactant is selected from Fe(III) chelates of (n-hydroxyethyl) ethylene diamine triacetic acid, nitrilotriacetic acid, and mixtures of such chelates.

25. The process of claim 12 wherein the reactant is selected from Fe(III) chelates of (n-hydroxyethyl) ethylene diamine triacetic acid, nitrilotriacetic acid, and mixtures of such chelates.

26. A process for the removal of $H_2S$, $CO_2$, and COS from a sour gaseous stream containing $H_2S$, $CO_2$, and COS comprising:
(a) contacting said sour gaseous stream in a contacting zone with a lean $CO_2$, COS-selective liquid absorbent mixture containing an effective amount of an oxidizing reactant comprising polyvalent metal ions, polyvalent metal chelate compounds, and mixtures thereof, under conditions to produce a sweet gaseous stream and a liquid absorbent admixture containing $CO_2$, COS, solid sulfur and a reduced reactant;
(b) stripping $CO_2$ and COS from said absorbent admixture in a stripping zone to produce a gas stream comprising $CO_2$ and COS;
(c) contacting the gas stream comprising $CO_2$ and COS with a catalyst for the hydrolysis of COS, in the presence of water, and under conditions to react COS and water and produce a gas stream containing $CO_2$ and $H_2S$;
(d) removing the $H_2S$ from the gas stream;
(e) regenerating the absorbent admixture remaining from step (b) in a regeneration zone with oxygen to produce a regenerated reactant absorbent admixture;
(f) employing regenerated absorbent admixture as lean $CO_2$, COS-selective liquid reactant absorbent mixture in the contacting zone.

27. The process of claim 1 wherein the $H_2S$ is removed in step (d) by contacting the gas stream with an $H_2S$-selective liquid absorbent in an absorption zone to produce a purified gas stream and $H_2S$-containing absorbent, $H_2S$-containing absorbent is passed from the absorption zone to a regeneration zone, the bulk of the H₂S is removed from the absorbent in the regeneration zone, and lean liquid absorbent is returned to the absorption zone.

28. The process of claim 27 wherein H₂S desorbed in the regeneration zone is passed to the contacting zone of step (a) and converted to sulfur.

29. The process of claim 26 wherein sulfur is removed prior to regenerating the absorbent admixture in step (e).

30. The process of claim 26 wherein sulfur is removed after regenerating the absorbent admixture in step (e).

31. The process of claim 26 wherein the H₂S is removed in step (d) by contacting the gas stream with an H₂S-selective liquid absorbent in an absorption zone to produce a purified gas stream and H₂S-containing absorbent, H₂S-containing absorbent is passed from the absorption zone to a regeneration zone, the bulk of the H₂S is removed from the absorbent in the regeneration zone, and lean liquid absorbent is returned to the absorption zone.

32. The process of claim 31 wherein H₂S desorbed in the regeneration zone is passed to the contacting zone of step (a) and converted to sulfur.

33. The process of claim 32 wherein sulfur is removed prior to regenerating the absorbent admixture in step (e).

34. The process of claim 32 wherein sulfur is removed after regenerating the absorbent admixture in step (e).

35. The method of any one of claims 1 through 34 wherein the stream from which the H₂S, CO₂, and COS are removed is selected from naturally-occurring gases, synthesis gases, process gases, and fuel gases.

36. The method of any one of claims 1 through 34 wherein the sour gaseous stream is selected from natural gas, a stream derived from the gasification of coal, or a hydrocarbon stream.

* * * * *